United States Patent Office 3,185,812
Patented May 25, 1965

3,185,812
GAS-SHIELDED ELECTRIC ARC WELDING
Kenneth E. Richter, Morristown, and Thomas A. Craig, Linden, N.J., assignors to Union Carbide Corporation, a corporation of New York
No Drawing. Filed Nov. 23, 1962, Ser. No. 239,765
5 Claims. (Cl. 219—74)

This invention relates to gas-shielded electric arc welding and, more particularly, to electric welding of steels such as for example stainless steels and maraging nickel steels.

Maraging nickel steels are a group of new, very low carbon, iron-nickel alloys; currently there are grades known as 18 percent nickel, 20 percent nickel, and 24 percent nickel. These steels are strengthened by an age hardening mechanism which occurs upon heating the low-carbon martensite structure at moderate temperatures after austenitizing at 1500 degrees F. and cooling to ambient or subambient temperatures. The term "maraging" is derived from aging of the martensite.

A welding process, of the type contemplated by our invention, is characterized by repetitive, controlled circuit short circuiting of the consumable electrode wire and weld puddle with transfer of weld metal from the electrode to the puddle only during short circuiting. A more complete description of the type of metal transfer is disclosed by Tuthill et al., U.S. Patent No. 2,886,696. The disclosure of such welding process, as required herein for a complete understanding of our invention, is incorporated by reference. This process is referred to commercially as the Short-Arc process. For the remainder of this disclosure, the term Short-Arc will be used to denote the above-described type of metal transfer.

Short-Arc welding of carbon steel has gained wide acceptance throughout industry. The use of the process on stainless steels and the new maraging nickel steels has been inhibited because of the viscosity of the weld puddle obtained and the inability of the common gas mixtures to produce acceptable weld bead shapes. Further, in the maraging nickel steels, as with most metals, the weld metal should match the base metal. In the case of maraging nickel steels, the maximum carbon content is about 0.03 percent by weight. Accordingly, the carbon content of the weld metal should be 0.03 percent by weight or less. Up until now there has not been available a successful method for Short-Arc welding the maraging nickel steels since there has been no way to keep the carbon below the maximum value while obtaining good weld puddle fluidity and bead shape.

It is a main object of the invention to provide a short circuiting-type metal transfer welding process for metals such as stainless steels, maraging nickel steels, and other metals which are either difficult or impossible to weld with Short-Arc-type welding because of lack of weld puddle fluidity.

It is another object to provide a Short-Arc welding process wherein satisfactory weld puddle fluidity and weld bead shape are obtainable on such metals.

Another object is to provide a process for Short-Arc welding stainless steel wherein corrosion properties of the weld are good.

Yet another object is to provide a process for Short-Arc welding of maraging nickel steels wherein carbon in the weld metal is maintained below a maximum value.

It is a further object of the invention to provide a process for all-position (flat, vertical, or overhead) welding of stainless steels and maraging nickel steels.

Our invention is predicated on the discovery that the Short-Arc welding process can be utilized to weld metals such as stainless steels and maraging nickel steels with a gaseous atmosphere containing about 85 percent to about 95 percent by volume helium, about 3 percent to about 11 percent argon, and about 1 percent to about 4 percent carbon dioxide.

While the description will be limited to representative stainless steels and maraging steels, it should be clearly understood that the advantages of our process are applicable to any metal wherein weld puddle fluidity is poor with normal Short-Arc welding.

Various gas mixtures have been used in consumable electrode spray transfer welding. These same gas mixtures do not provide equivalent results when the metal transfer is by repetitive short circuits. Spray transfer welding, which will be referred to as Sigma from hereon in this disclosure, is inherently a high heat input process. Short-Arc, on the other hand, is a low heat input process. When an attempt is made to apply the latter process to metals such as stainless steels or maraging nickel steels, the weld puddle fluidity is not satisfactory and the bead shapes obtained are peaked and lacking in fusion. Consequently, it was realized that a gas mixture must be utilized which will enhance fluidity and bead shape without adding carbon to the weld metal.

We have discovered that in order to Short-Arc weld stainless and maraging steels, the gaseous atmosphere surrounding the arc and weld zone must include a minimum of 85 percent helium while including a maximum of about 4 percent carbon dioxide; the remainder being argon. Preferably, the gas mixture should contain about 90 percent helium, about 2.5 percent carbon dioxide, and the balance argon.

If less than 85 percent helium is used, the weld puddle fluidity is poor with poor weld bead shapes. On the other hand, if too much helium is used, in excess of about 95 percent, the weld bead shape again is poor and unsatisfactory weld fusion results.

It was found that carbon dioxide, in amounts up to 4 percent in the helium, aided in obtaining fluidity over addition of pure oxygen. The carbon dioxide provides large metal droplets from the consumable wire at a slow rate with the result that the arc is on for larger periods of time. This improves the fluidity of the puddle. However, the carbon dioxide must be kept to a minimum. When welding stainless steel, carbon pickup in the weld metal will affect corrosion properties. If the carbon dioxide in the gas mix is kept to a maximum of 4 percent and preferably about 2.5 percent, the corrosive attack on the weld metal is no greater than with a mixture which contains no carbon such as argon-oxygen mixtures.

We have discovered that for Short-Arc welding of the metals discussed, the gas mixture is critical and the composition of such mixture must be maintained between the limits set forth in order to obtain the advantages of the invention.

Laboratory investigation of the method of the invention was carried out on stainless steels types 304, 310, 316, 321, and 410 and on 18 percent nickel maraging steel.

On the maraging nickel steels it was found that a gas mixture of 90 percent helium, 7½ percent argon, and 2½ percent carbon dioxide produced extremely good weld bead shape and puddle fluidity while the carbon content of the weld metal was below the maximum allowable content. The weld chemistry of an exemplary weld made on 18 percent nickel maraging steel is given in Table I below:

TABLE I

*18 percent nickel maraging steel*

GAS MIXTURE: 90 PERCENT HELIUM, 7½ PERCENT ARGON, 2½ PERCENT CARBON DIOXIDE

| Element | Weld metal, percent | Base plate | 0.030 wire |
|---|---|---|---|
| C | 0.01 | 0.017 | 0.01 |
| Mn | 0.02 | 0.07 | |
| Si | 0.10 | [1] 0.16 | |
| Co | 7.9 | 8.1 | 8.3 |
| Mo | 5.2 | 4.7 | 5.1 |
| Ti | 0.31 | 0.50 | 0.40 |
| Ni | 17.1 | 18.0 | 17.1 |
| Al | 0.03 | 0.12 | |
| S | 0.005 | 0.004 | 0.004 |
| P | | 0.006 | |

[1] High.

From the above table it can be observed that the carbon in the weld metal was about 0.01 percent, which is well within the maximum allowable of 0.03 percent. Carbon contents above 0.03 percent will result in metals which will not react as well to the maraging process.

It also has been observed that oxygen can not be substituted for the carbon dioxide. The oxygen in gas is deleterious to the titanium content. Titanium must be between 0.3 and 0.5 percent. The oxygen unites with the titanium to form oxides which are carried out of the weld. Further, the oxygen in the gas mixture had adverse effects on the weld fluidity and bead shape.

A typical example of conditions for carrying out the process of the invention on 18 percent maraging steel is as follows: a 0.030 in. diameter wire, having the same composition as the base plate, was connected in a welding circuit with an SVI–300 power supply. The current was about 130 to 135 amperes at 18 volts. The slope setting on the SVI was 1½ steep; the inductance setting was 6¾ low. The shielding gas was 90 percent helium, 7½ percent argon, and 2½ percent carbon dioxide.

Investigation of the above-mentioned stainless steels was carried out because they represent the stainless steels most widely used in industry. Apparatus similar to that shown in Tuthill, U.S. Patent No. 2,886,696, was used in the investigation. Best results were obtained with gas mixture of the invention with a Linde SVI power supply which is described and claimed in U.S. Patent No. 3,054,-884. The Linde SVI power supply is characterized by means for selectively deriving therefrom a static volt ampere characteristic curve so as to control the magnitude of short circuit current and for coarsely setting welding circuit time constant, and a selectively variable impedance associated with the power source for finally controlling the final value of the circuit time constant and such impedance providing means for correlating the final circuit time constant with the slope of the static volt ampere characteristic. Welding voltages are generally between 22 and 24 volts with preferably from about 200 to about 700 microhenries inductance in the D.C. side of the SVI power supply which corresponds to an inductor setting of 6½ low to 1½ high. The slope setting on the power supply is desirably between 1½ and 2 steep which corresponds to a slope of about 6 to 8 volts per 100 amperes. The welding current is preferably between 50 to 100 amperes. The above values of slope and added inductance are included to provide a complete description of one of the best modes of performing the subject process. While these values are preferred, they are in no way to be considered as limiting the invention to these specific values.

Table II, below, illustrates typical welding conditions for carrying out the process of the invention on stainless steel.

TABLE II

*Welding conditions illustrative of the present invention*

| Type | Material thicknesses, inch | SVI-300 power supply settings | | | Current, amperes | Voltage, volts | Wire speed, i.p.m. |
|---|---|---|---|---|---|---|---|
| | | S(steep) | V(low) | I | | | |
| 304 | 0.062–0.062 | 1½ | 6 | 6½ low | 55 | 22½ | 144 |
| | 0.093–0.093 | 1½ | 7½ | 8 low | 72 | 23 | 194 |
| | 0.108–0.108 | 1½ | 8½ | 1½ high | 100 | 23½ | 252 |
| 321 | 0.062–0.062 | 2½ | 6½ | 1¾ high | 50 | 22 | 146 |
| | 0.093–0.093 | 2½ | 8½ | 1¾ high | 80 | 23½ | 206 |
| | 0.125–0.125 | 2½ | 9½ | 1½ high | 100 | 24 | 256 |
| 347 | 0.062–0.062 | 1½ | 6¾ | 6¾ low | 55 | 21½ | 146 |
| | 0.093–0.093 | 1½ | 8 | 1½ high | 75 | 23½ | 212 |
| | 0.125–0.125 | 1½ | 8½ | 1½ high | 100 | 23½ | 252 |

In all of the above examples, the gas flow rate was about 50 c.f.h. The consumable electrode was 0.030 in. diameter wire having the same general composition as the base stainless steel. The electrode was connected to the positive side of the power supply. The travel speed was about 12 to 14 i.p.m.

Welds made under the above conditions, with the gas mixture of the invention, displayed acceptable corrosion resistance in an atmosphere of 65 percent boiling nitric acid. The was no greater carbide precipitation with the subject mixture than with noncarbon dioxide containing gases. The gas mixture produced better wettability and overall bead shape.

While the above invention has been described in its best mode of operation, modification may be made thereto without departing from the spirit and scope of the invention.

What is claimed is:

1. A process for gas-shielded arc welding of stainless steel and maraging steels which comprises establishing a welding arc between a consumable electrode and the work; shielding the arc and adjacent metal with a gas mixture consisting of from about 85 percent to 95 percent helium, about 3 percent to about 11 percent argon, and about 1 percent to about 4 percent carbon dioxide; repetitively short circuiting said consumable electrode with said work at a frequency which permits transfer of metal from the consumable electrode to the work during short circuiting only.

2. A process for gas-shielded arc welding of stainless steel and maraging steels which comprises establishing a welding arc between a consumable electrode and the work; shielding the arc and adjacent metal with a gas mixture consisting of 90 percent helium, 7½ percent argon and 2½ percent carbon dioxide; repetitively short circuiting said consumable electrode with said work at a frequency which permits transfer of metal from the consumable electrode to the work during short circuiting only.

3. A shielding gas for Short-Arc welding of metals wherein weld puddle fluidity is poor which consists of from about 85 percent to 95 percent helium, about 3 percent to about 11 percent argon, and about 1 percent to about 4 percent carbon dioxide.

4. A process for Short-Arc welding of stainless steel and maraging steels which comprises impressing an arc voltage between a consumable electrode and a workpiece of such metals connected in welding circuit relation with a power source having means for selectively deriving therefrom a static volt-ampere characteristic curve so as to control the magnitude of short circuit current and for coarsely setting such welding circuit time constant and a selectively variable impedance associated with said power source for finely controlling the final value of the circuit time constant and such impedance providing means for correlating the final circuit time constant with the slope of the static volt-ampere characteristic; shielding said arc and adjacent metal with a gas mixture consisting of from about 85 percent to 95 percent helium, about 3 percent to about 11 percent argon, and about 1 percent to about 4 percent carbon dioxide; repetitively short circuiting said consumable electrode with said work at a frequency which permits transfer of metal from the consumable electrode to the work during short circuiting only.

5. A process for Short-Arc welding stainless steel which comprises impressing an arc voltage of from about 22 to 24 volts between a consumable electrode and said stainless steel in welding circuit relation with a power source having a static volt-ampere characteristic of about 6 to 8 volts per 100 amperes and having about 200 to 700 microhenries in the D.C. side of said power supply; shielding said arc and adjacent metal with a gas mixture consisting of 90 percent helium, 7½ percent argon, and 2½ percent carbon dioxide and repetitively short circuiting said consumable electrode with said stainless steel work at a frequency which permits transfer of metal from the consumable electrode to such work during short circuiting only.

References Cited by the Examiner
UNITED STATES PATENTS

| | | | |
|---|---|---|---|
| 2,753,427 | 7/56 | Yenni | 219—74 |
| 2,886,696 | 5/59 | Tuthill et al. | 219—137 |
| 3,054,884 | 9/62 | Manz et al. | 219—131 |

RICHARD M. WOOD, *Primary Examiner.*